Sept. 6, 1938.  J. D. HARRIS  2,129,354

REPAIR LINK

Filed Sept. 11, 1937

Inventor.
James D. Harris
by Heard Smith & Tennant.
Attys.

Patented Sept. 6, 1938

2,129,354

UNITED STATES PATENT OFFICE 2,129,354

REPAIR LINK

James Dexter Harris, Waban, Mass.

Application September 11, 1937, Serial No. 163,410

2 Claims. (Cl. 59—85)

This invention relates to a repair link for use in the repair of chains. Repair links are extensively used for the replacement of worn or broken links in the cross chains of automobile tire chains, as well as for the repair of various other chains.

It is important, particularly in the case of tire cross chains, that the repair link shall be of a character readily to be inserted in the broken or worn chain, and that it shall remain in place and not work loose or come off. Tire chains, particularly with the low pressure tires now in general use, function under such conditions that tension is not continuously maintained and repair links may work loose and come off.

It is the object of the present invention to provide a repair link which will remain firmly in place after insertion in the chain, and will not be released by release of tension, and which can only be placed in and removed from the chain by a special manipulation of the members of the link.

These and other objects and features of the invention will appear more fully from the accompanying description and drawing, and will be particularly pointed out in the claims.

The drawing illustrates a repair link of the general type disclosed in the patent to Carter, 1,452,476, granted April 17, 1923, constructed to embody a preferred form of the present invention.

Figure 1:
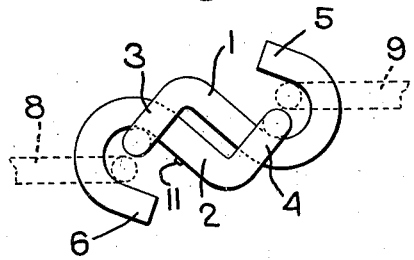
Fig. 1 is a plan view of the link in contracted position with the links of the chain in which it is inserted shown in dotted lines.

The link, as illustrated, is made of a pair of similar members, preferably formed from heavy wire or rod, each having a straight shank terminating at one end in an eye formed at right angles thereto, and at the other end in a hook projecting from the shank in a direction laterally opposite to the eye.

The link therefore comprises a pair of relatively slidable shanks 1 and 2 with the eye 3 formed upon one end of the shank 1 and embracing the opposite shank 2 and with eye 4 formed upon one end of shank 2 and embracing the opposite shank 1. A hook 5 is formed upon the end of the shank 1 opposite its eye, and a hook 6 upon the end of the shank 2 opposite its eye. Thus it will be seen that when the link is expanded, as in Fig. 2, the eyes 3 and 4 contact with each other and limit in the expanding direction the slidability of the shanks.

Figure 2:
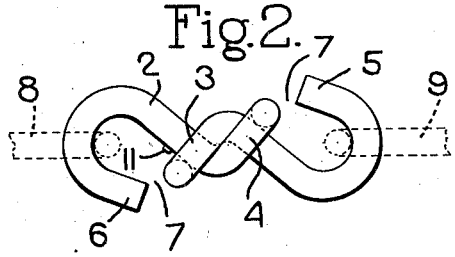
Fig. 2 is a view similar to Fig. 1 with the link expanded.
Figure 3:
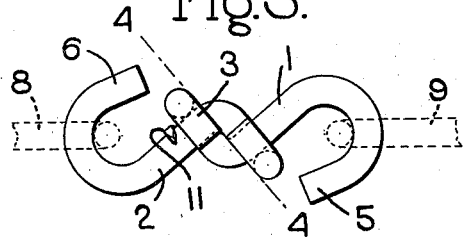
Fig. 3 is a view similar to Fig. 2 looking at the opposite face.

When the link is expanded, as in Fig. 2, the space 7 between each eye and the adjacent hook, that is, between the eye 3 and the hook 6 and between the eye 4 and the hook 5, is substantially less than when the link is contracted, as shown in Fig. 1. The purpose of this is, in this type of link, to enable the chain links 8 and 9 to enter through the space 7 when the link is contracted but to prevent them from passing out through this space when the link is expanded, the dimensions being properly proportioned to effect that result.

But it will be recognized that if the tension on the entire chain after the repair link is inserted is lessened or released, the repair link may move partially or wholly from its expanded to its contracted position and thus widen the space between the eye and the hook to such an extent as to allow the link of the chain and the repair link to come apart.

Figure 4:
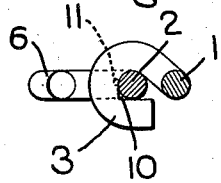
Fig. 4 is a view in cross-section taken on the line 4—4 of Fig. 3.

This danger of the release of the repair link upon a release of tension is practically eliminated by the present invention. In the present invention, the eye of at least one of the shanks, as, for example, the eye 3, has its inner periphery formed noncircular. This noncircular configuration may be of any required type, but it is very simply effected by forming a sharp recess or angular bend such as 10 in the inner periphery of the eye. The shank on which the eye thus formed slides is also formed to have a cross-section between the eye and the adjacent hook corresponding to the noncircular periphery of the eye, but this cross-section of the shank is located rotarily out of alignment with the corresponding noncircular configuration of the eye when the link is expanded. The desired cross-section of the shank may be given in any suitable manner, but when the eye is formed with the recess 10, as in Fig. 4, it is sufficient to form on the shank a projection 11 which may be struck up from the metal thereof, and of a size and shape to fit the recess 10. It will be noted that, as shown in Fig. 4, this projection is rotarily out of alignment with the recess 10 when the link is in its normal expanded position.

Consequently, in order that the link may contract to a position where the links of the chain may be released therefrom, it is necessary not only that the link have the contracted movement, but it must also have a rotary movement to just the extent required to allow the recess 10 to slip over the projection 11. The chance that the link will so adjust itself to exactly the right position to allow the parts to move to the contracted position especially when the hooks are engaging the chain links is so remote as to be negligible. When it is desired to insert or replace the link manually, it is a simple matter to manipulate the link so as to bring the required cross-sections or the recess and the projection into alignment, it being understood that the two parts of links of this type as made commercially have a sufficiently loose interengagement to permit the limited rotary movement required for this purpose.

There is thus presented a very simple, strong and effective repair link which when once inserted in a chain can only be removed therefrom by careful manipulation.

I claim:

1. A repair link comprising a pair of relatively slidable shanks, and an eye formed upon one end of each shank and embracing the opposite shank, hooks formed upon the remaining ends of the shanks with the space between each eye and the adjacent hook when the link is expanded being substantially less than when the link is contracted, the inner periphery of one of said eyes being non-circular, and the shank on which it slides having a cross section, between said eye and the adjacent hook, corresponding to said noncircular periphery but rotarily out of alignment therewith when the link is expanded to require relative rotation of the eyes and shanks to permit the link to be contracted.

2. A repair link comprising a pair of relatively slidable shanks, and an eye formed upon one end of each shank and embracing the opposite shank, hooks formed upon the remaining ends of the shanks with the space between each eye and the adjacent hook when the link is expanded being substantially less than when the link is contracted, the inner periphery of one of said eyes having a recess therein and the shank on which it slides having a projection between said eye and the adjacent hook fitting said recess, but rotarily out of alignment therewith when the link is expanded to require relative rotation of the eyes and shanks to permit the link to be contracted.

JAMES DEXTER HARRIS.